United States Patent [19]

Folz

[11] 3,721,742

[45] March 20, 1973

[54] ANTHELMINTIC METHOD AND FORMULATIONS EMPLOYING PHENYLHYDRAZONE DERIVATIVES

[75] Inventor: Sylvester D. Folz, Kalamazoo, Mich.

[73] Assignee: The Upjohn Company, Kalamazoo, Mich.

[22] Filed: July 13, 1970

[21] Appl. No.: 54,619

[52] U.S. Cl. .................................................424/327
[51] Int. Cl. ...............................................A61k 27/00
[58] Field of Search ........424/327; 260/566 B, 566 D Primary Examiner—Sam Rosen
Attorney—Carl A. Randles, Jr. and John Kekich

[57] ABSTRACT

Certain new ($\alpha$-fluoroalkyl)benzoyl chloride phenylhydrazones have been found to be effective, broad-spectrum anthelmintics for suppressing parasitic worms in animals particularly sheep. The method of using the new compounds and new anthelmintic formulations are described. The new compound $\alpha,\alpha,\alpha$-trifluoro-m-toluoyl chloride phenylhydrazone is effective at rates at least as low as 100 mg. per kilogram of body weight in sheep. The compounds are readily prepared by conventional chemical reactions.

24 Claims, No Drawings

ANTHELMINTIC METHOD AND FORMULATIONS EMPLOYING PHENYLHYDRAZONE DERIVATIVES

SUMMARY OF INVENTION

This invention pertains to a new method for killing and controlling (suppressing growth and reproduction of) worms (Helminths), and new formulations for killing and controlling worms in animals. The invention more particularly pertains to a new method for killing and controlling parasitic worms in animals with new ($\alpha$-fluoroalkyl, i.e., $\alpha$-F$_n$alkyl)benzoyl chloride phenylhydrazones, and new anthelmintic formulations comprising the new compounds for the stated new method.

Parasitic worm infections cause unmeasured but certainly great losses and inefficiency in the production of economic livestock, e.g., cattle, sheep, goats, swine, and poultry; and in the care and maintenance of pets, e.g., dogs, cats, and horses. This invention contributes further to the progress that man has already achieved in his efforts to keep his economic livestock and pets healthy and contented.

One objective of this invention is to describe how some new ($\alpha$-fluoroalkyl)benzoyl chloride phenylhydrazones can be used to curb helminth parasitism in animals. Another objective is to show various anthelmintic formulations of ($\alpha$-fluoroalkyl)benzoyl chloride phenylhydrazones, and how they can be administered to worm infected animals for killing and control of the helminth parasites. The formulations of the invention can be administered to animals for prophylactic treatment of infections. These and other objectives of the invention will become apparent in the detailed description that follows.

DETAILED DESCRIPTION OF THE INVENTION

The ($\alpha$-fluoroalkyl)benzoyl chloride phenylhydrazone active ingredients of the method and formulations of this invention are new, only recently synthesized compounds. As the foregoing general name indicates, the new compounds are characterized by an $\alpha$-fluoroalkyl substituent on the "benzoyl chloride" portion of a phenylhydrazone. The new ($\alpha$-fluoroalkyl)benzoyl chloride phenylhydrazones have the structural formula:

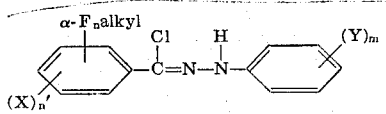

wherein $\alpha$-F$_n$alkyl is an $\alpha$-fluoroalkyl group of from one to three carbon atoms, inclusive; X is halogen, i.e., chlorine, bromine, iodine, and fluorine, nitro, alkyl of from one to six carbon atoms, inclusive, and $\alpha$-F$_n$alkyl; Y is alkyl of from one to six carbon atoms, inclusive, $\alpha$-F$_n$alkyl as defined above, halogen, and nitro; $n$ is an integer 2 or 3, $n'$ is an integer 0 to 3, inclusive; and $m$ is an integer from 0 to 3, inclusive, the sum of $n' + m$ being not more than 5, the sum of carbon atoms in alkyl substituents being not more than 15, there may be no more than one nitro group in the molecule, and not more than two $\alpha$-F$_n$alkyl groups on any one benzene ring or three total in the molecule.

The new compounds of this invention, for example, $\alpha,\alpha,\alpha$-trifluoro-m-toluoyl chloride phenylhydrazone, are particularly effective against worms, particularly parasitic worms of animals, and more particularly helminths parasitic in ovines (sheep).

Activity of the new ($\alpha$-fluoroalkyl)benzoyl chloride phenylhydrazones was initially observed against *Nematospiroides dubius* and *Syphacia obvelata* in mice. Further observations in lambs naturally infected with *Haemonchus*, *Ostertagia*, *Trichostrongylus*, *Nematodirus Strongyloides*, *Oesophagostomum*, *Bunostomum*, *Trichuris*, and/or *Moniezia* showed that the compounds are active at practical low dosages, and that they possess broad-spectrum activity, e.g., against both roundworms and tapeworms.

A preliminary test with lambs was effected by maintaining worm infected lambs under satisfactory environmental conditions with feed and water available ad libitum. Pretreatment fecal examinations were made in order to characterize and evaluate the parasitism of each animal. The presence of helminth ova was recorded in terms of the number of eggs per gram of feces.

On the day of treatment, each lamb was weighed and a dosage for it was calculated in terms of milligrams of new compound per kilogram of body weight. The calculated dosage of compound was pulverized and packed in a gelatin capsule for oral administration.

In this preliminary test one lamb received 250 mg. $\alpha,\alpha,\alpha$-trifluoro-m-toluoyl chloride phenylhydrazone per kilogram of body weight—a total dosage of 6.3 g. After treatment, there was no significant changes in helminth egg counts, few dead helminths in the feces, and severe infection at necropsy thus indicating that the 250 mg./kg. dosage was not effective in this animal. This particular result appears to have been anomalous, as will be shown hereinafter.

Another lamb received 350 mg./kg. of the compound — a total dosage of 7.9 g. In this case, the helminth egg counts were lowered significantly and on necropsy worm infection was found to be low. The egg counts and observations at necropsy established activity against *Haemonchus*, *Ostertagia*, *Trichostrongylus*, *Nematodirus*, and *Strongyloides*.

Still another lamb received 450 mg./kg. of the compound — a total dosage of 10.4 g. Activity against *Haemonchus* and *Stronglyoides* was established by significantly lowered egg counts and absence of worms at necropsy. According to this preliminary test, the compound is established as useful for killing and controlling worms in sheep.

Further, the compound and the other compounds of the invention are contemplated as useful for killing and controlling parasitic worms in ovines, bovines, equines, porcines, aves, canines, felines, piscines and other animals.

EXAMPLE 1

A subsequent, similar, but more extensive test showed excellent activity at 100 mg. and 200 mg. per kilogram of body weight. At the 200 mg./kg. dosage, the compound $\alpha,\alpha,\alpha$-trifluoro-m-toluoyl chloride phenylhydrazone was efficacious against *Haemonchus*, *Ostertagia*, *Nematodirus*, *Trichostrongylus*, *Strongyloides*, *Oesophagostomum*, *Cooperia*, and *Bunostomum*. At this dosage, activity against the tapeworm *Moniezia* was observed.

At the 100 mg./kg. dosage, similar broad spectrum anthelmintic activity was observed, including activity against *Moniezia*. In view of the absence of signs of toxicity of the compound to the lambs, a new, advantageous anthelmintic agent has been discovered.

In the comprehensive test with 100 mg./kg. and 200 mg./kg. dosages of $\alpha,\alpha,\alpha$-trifluoro-m-toluoyl chloride phenylhydrazone, five lambs were used for each dosage level, and five lambs were maintained as unmedicated controls. Daily egg counts in the feces were made before and after treatment. The lambs were killed and examined post-mortem for worms present 11 days after treatment. Helminth populations were recovered, enumerated and identified.

The mean percentage efficacy against specific helminths in the test lambs was calculated by subtracting the average number of the helminths observed in the treated lambs, post-mortem, from the average number observed in the unmedicated controls, post-mortem; dividing the remainder by the latter average number; and multiplying by 100. Accordingly, the mean percentage efficacies against the various helminths identified in the test lambs were calculated and found to be as follows:

| Helminth | 100 mg./kg. | 200 mg./kg. |
| --- | --- | --- |
| Haemonchus | 100 | 100 |
| Ostertagia | 100 | 100 |
| Trichostrongylus | 100 | 100 |
| Nematodirus | 89.5 | 100* |
| Strongyloides | 95.9 | 100 |
| Oesophagostomum | 96.9 | 99.1 |
| Bunostomum | — | 100* |
| Cooperia | 100* | 100 |
| Trichuris | 0 | — |
| Tapeworm | positive | positive* |

\* = only one lamb infected
— = parasites not present

The total numbers of various helminths found in the non-medicated control lambs, post-mortem, were as follows:

NON-MEDICATED CONTROL GROUP DATA—TOTAL NUMBER OF PARASITES RECOVERED AT NECROPSY

| Lamb Number | Helminth | | | | | | | | | |
| --- | --- | --- | --- | --- | --- | --- | --- | --- | --- | --- |
| | Haemonchus | Ostertagia | Trichostrongylus | Nematodirus | Strongyloides | Oesophagostomum | Bunostomum | Cooperia | Trichuris | Tapeworm |
| 314 | 16 | 2 | 11 | 2 | 11 | 1 | — | — | 5 | — |
| 326 | 130 | 40 | 1,110 | — | 430 | — | 50 | — | 45 | — |
| 330 | 1,210 | 640 | 190 | 30 | 710 | 6 | 40 | 360 | 2 | — |
| 335 | 180 | 70 | 38 | 4 | 29 | — | — | 31 | 3 | — |
| 338 | 930 | 260 | 110 | 40 | 130 | 18 | — | 30 | 86 | — |
| Total number of parasites remaining | 1,366 | 912 | 1,459 | 76 | 610 | 25 | 90 | 421 | 141 | — |
| Average number of parasites remaining | 273 | 182 | 292 | 19 | 122 | 8 | 45 | 140 | 28 | — |
| Number lambs infected at necropsy | 5 | 5 | 5 | 4 | 5 | 3 | 2 | 3 | 5 | — |

—=No infection (or very light infection).
0=Parasitism detected as indicated by EPG data, but no parasites recovered.

The total numbers of the various helminths found in the 100 mg./kg. dosage group, post-mortem, were as follows:

TREATMENT AT 100 MG./KG. GROUP DATA—TOTAL NUMBER OF PARASITES RECOVERED AT NECROSPY

| Lamb Number | Helminth | | | | | | | | | |
| --- | --- | --- | --- | --- | --- | --- | --- | --- | --- | --- |
| | Haemonchus | Ostertagia | Trichostrongylus | Nematodirus | Strongyloides | Oesophagostomum | Bunostomum | Cooperia | Trichuris | Tapeworm |
| 300 | 0 | 0 | 0 | 4 | 0 | 0 | — | — | 49 | 0 |
| 308 | 0 | 0 | 0 | — | 0 | 1 | — | 0 | 66 | 0 |
| 315 | 0 | 0 | 0 | 0 | 23 | 0 | — | — | 23 | — |
| 320 | 0 | 0 | 0 | — | 0 | 0 | — | — | 4 | — |
| 325 | 0 | 0 | 0 | — | 2 | — | — | — | 135 | — |
| Total number of parasites remaining | 0 | 0 | 0 | 4 | 25 | 1 | — | 0 | 277 | 0 |
| Average number of parasites remaining | 0 | 0 | 0 | 2 | 5 | 4 | — | 0 | 55 | 0 |
| Percent efficacy | 100 | 100 | 100 | 89.5 | 95.9 | 96.9 | — | 100 | 0 | Positive |

—=No infection (or very light infection).
0=Parasitism detected as indicated by EPG data, but no parasites recovered.

The total numbers of the various helminths found in the 20 mg./kg. dosage group, post-mortem, were as follows:

TREATMENT AT 200 MG./KG. GROUP DATA—TOTAL NUMBER OF PARASITES RECOVERED AT NECROPSY

| Lamb Number | Helminth | | | | | | | | | |
| --- | --- | --- | --- | --- | --- | --- | --- | --- | --- | --- |
| | Haemonchus | Ostertagia | Trichostrongylus | Nematodirus | Strongyloides | Oesophagostomum | Bunostomum | Cooperia | Trichuris | Tapeworm |
| 303 | 0 | 0 | 0 | — | 0 | 0 | 0 | 0 | — | — |
| 312 | 0 | 0 | 0 | — | 0 | 0 | — | 0 | 6 | 0 |
| 317 | 0 | 0 | 0 | — | 0 | 2 | — | 0 | 2 | — |
| 322 | 0 | 0 | 0 | — | 0 | 0 | — | — | 3 | — |
| 337 | 0 | 0 | 0 | 0 | 0 | 0 | — | 0 | 2 | — |
| Total number of parasites remaining | 0 | 0 | 0 | 0 | 0 | 2 | 0 | 0 | 13 | 0 |
| Average number of parasites remaining | 0 | 0 | 0 | 0 | 0 | 1 | 0 | 0 | 3 | 0 |
| Percent efficacy | 100 | 100 | 100 | 100 | 100 | 99.1 | 100 | 100 | | Positive |

—=No infection (or very light infection).
0=Parasitism detected as indicated by EPG data, but no parasites recovered.

From an evaluation of the foregoing test results, it is concluded that the new (α-fluoroalkyl)benzoyl chloride phenylhydrazones of this invention, particularly trifluoromethylbenzoyl chloride phenylhydrazones according to Formula I and more particularly α,α,α-trifluoro-m-toluoyl chloride phenylhydrazone, are efficacious anthelmintic agents.

In the foregoing tests, the new compound α,α,α-trifluoro-m-toluoyl chloride phenylhydrazone was administered orally as a finely divided solid (a powder) in a gelatin capsule. This uncomplicated form and route of administration is convenient for the compounds of this invention because they are solids at room temperature and they are not very soluble (almost insoluble) in water. A single dose was administered, but multiple doses can be used.

Other forms and routes of administration, and other formulations of the active ingredient are contemplated as embodiments of this invention. For example, aqueous or oil suspensions can be administered orally, or the compounds can be formulated with a solid carrier for feeding. Furthermore, an oil suspension can be converted into an aqueous emulsion by mixing with water and injecting the emulsion intramuscularly, subcutaneously or into the peritoneal cavity.

Pure compounds, mixtures of the active compounds, or combinations thereof with a solid carrier can be administered in the animal's food, or administered in the form of tablets, pills, boluses, wafers, and other conventional unit dosage forms. All of these various forms of the active compounds of this invention can be prepared using physiologically acceptable carriers and known method of formulation and manufacture.

Representative solid carriers conveniently available and satisfactory for physiologically acceptable, unit dosage formulations include corn starch, powdered lactose, powdered sucrose, talc, stearic acid, magnesium stearate, finely divided bentonite, and the like. The active agent can be mixed with a carrier in varying proportions from, for example, about 0.001 per cent by weight in animal food to about 90 or 95 per cent or more in a pill or capsule. In the latter form, one might use no more carrier than sufficient to bind the particles of active compound.

The compounds of this invention should be mixed with animal feeds, in a way that will avoid degradation of the compound. The chlorine atom on the carbonyl carbon is substantially reactive, and amino groups and enzymes present in a feed might promote degradation. Certain kinds of animal feeds such as whole oats will give no problem, but others such as ground feed mixes can. Accordingly, administration to animals via their feed will require some information, judgment, and evaluation.

In general, the compounds can be formulated in stable powders or granules for mixing in an amount of feed for a single feeding or enough feed for one day and thus obtain therapeutic efficacy without complication. It is the prepared and stored feeds or feed premixes that require care. A recommended practice is to coat a granular formulation to protect and preserve the active ingredient. A prepared hog-feed containing about 0.2 percent of the active compound will provide a dosage of about 100 mg. per kg. body weight for each 100 lb. pig in its daily ration.

A solid diluent carrier need not be a homogeneous entity, but mixtures of different diluent carriers can be used. Moreover, formulations with a solid carrier can include small proportions of adjuvants such as water; alcohols; protein solutions and suspensions like skimmed milk; edible oils; sugar solutions, e.g., syrups; and organic adjuvants such as propylene glycols, sorbitol, glycerol, diethyl carbonate, and the like.

The solid carrier formulations of the invention are conveniently prepared in unit dosage forms, to facilitate administration to animals. Accordingly, several large boluses (about 20 g. weight) amounting to about 54 g. of active compound would be required for a single dosage to a 900 lb. horse at a dosage rate of 50 mg./kg. of body weight. Similarly, a 60 lb. lamb at a dosage rate of 100 mg./kg. of body weight would require a pill, capsule, or bolus containing about 2.7 g. of active compound. A small dog, on the other hand, weighing about 20 lbs., would require a total dosage of about 225 mg. at a dosage rate of 25 mg./kg. of body weight. The solid, unit dosage forms can be conveniently prepared in various sizes and concentrations of active ingredient, to accommodate treatment of the various sizes of animals that are parasitized by worms.

Liquid formulations can also be used. Representative liquid formulations include aqueous (including isotonic saline) suspensions, oil solutions and suspensions, and oil in water emulsions. Aqueous suspensions are obtained by dispersing the active compound in water, preferably including a suitable surface-active dispersing agent such as a cationic, anionic, or non-ionic surface-active agents. Representative suitable ones are polyoxyalkylene derivatives of fatty alcohols and of sorbitan esters, and glycerol and sorbitan esters of fatty acids. Various dispersing or suspending agents can be included and representative ones are synthetic and natural gums, tragacanth, acacia, alginate, dextran, gelatin, sodium carboxymethylcellulose, methylcellulose, polyvinylpyrrolidone, and the like. The proportion of the active compound in the aqueous suspensions of the invention can vary from about 1 percent to about 20 percent or more.

Oil solutions are prepared by mixing the active compound and an oil, e.g., an edible oil such as cottonseed oil, peanut oil, coconut oil, modified soybean oil, and sesame oil. Usually, solubility in oil will be limited and oil suspensions can be prepared by mixing additional finely divided compound in the oil.

Oil in water emulsions are prepared by mixing and dispersing an oil solution or suspension of the active compound in water preferably aided by surface-active agents and dispersing or suspending agents as indicated above.

In general, the formulations of this invention are administered to animals so as to achieve therapeutic or prophylactic levels of the active compound. At present, it is known that 100 mg./kg. of body weight in lambs will effectively combat a wide variety of parasitic worms. Much lower effective dosages are contemplated, e.g., in the range of 25 to 75 mg./kg. of body weight.

In other animals, and for other kinds of parasitic worms, definitive dosages can be proposed. Contemplated are dosage rates of about 1 mg. to about 800 mg. per kg. of body weight. A preferred, contemplated range of dosage rates is from about 5 mg. to about 400 mg. per kg. of body weight. In this regard, it should be noted that the concentration of active compound in the formulation selected for administration is in many situations not critical. One can administer a larger quantity of a formulation having a relatively low concentration and achieve the same therapeutic or prophylactic dosage as a relatively small quantity of a relatively more concentrated formulation. More frequent small dosages will likewise give results comparable to one large dose. Unit dosage forms in accordance with this invention can have anywhere from less than 1 mg. to 500 g. of active compound per unit.

If desired the solid unit dosage forms of this invention including pellets and granules can be coated so as to provide timed release in the digestive system of animals. Such laminated or enteric coated forms are prepared by appropriately applying to a pill or bolus a polymeric acid or a mixture of a polymeric acid with shellac, and cetyl alcohol, cellulose acetate, or styrene maleic acid copolymer.

The new anthelmintic ($\alpha$-fluoroalkyl)benzoyl chloride phenylhydrazones of Formula I above, are readily prepared by reacting a selected ($\alpha$-fluoroalkyl)benzoic acid 2-phenylhydrazide with phosphorus pentachloride, reacting the resulting, corresponding ($\alpha$-fluoroalkyl)-benzoyl chloride (dichlorophosphinyl)phenylhydrazone with phenol, and recovering the desired ($\alpha$-fluoroalkyl)benzoyl chloride phenylhydrazone. The process can be represented as follows:

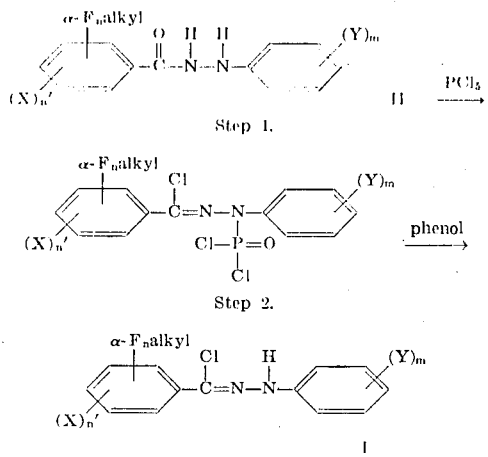

Step 1. of the foregoing process proceeds when the ($\alpha$-fluoroalkyl)benzoic acid 2-phenylhydrazide starting compound (compounds of Formula II, above) and the phosphorus pentachloride are mixed in the presence of a reaction medium at a temperature in the range of about 10° C. up to about the boiling point of the reaction medium. Higher and lower temperatures can be used, however. The reaction rate will be decreased at low temperatures, and a pressure vessel would be needed to effect reaction temperatures above the boiling point at atmospheric pressure. In accordance with a preferred embodiment, the initial reaction mixture is heated.

Appropriate reaction media include, for example, the chlorinated hydrocarbon solvents, aliphatic or aromatic hydrocarbon solvents, and ethers. Representative specific ones are carbon tetrachloride (preferred), methylene chloride, chloroform, 1,2-dichloroethylene, benzene, toluene, technical hexane, diethyl ether and dioxane.

The process can be practiced without isolating the ($\alpha$-fluoroalkyl)benzoyl chloride (dichlorophosphinyl)phenylhydrazone intermediate when three equivalents or more of phenol are added to the initial reaction mixture after it has been cooled to about 0° to 25° C. The phenol reacts with the ($\alpha$-fluoroalkyl)benzoyl chloride (dichlorophosphinyl)phenylhydrazone intermediate to produce triphenyl phosphate, and the desired ($\alpha$-fluoroalkyl)benzoyl chloride phenylhydrazone is then recovered and purified by conventional methods. The solvent medium is removed by evaporation, and the desired product is recovered by methods of physical separation, e.g., filtration from the residual triphenyl phosphate or by chromatographic techniques. The compound is purified by recrystallization.

The ($\alpha$-fluoroalkyl)benzoic acid 2-phenylhydrazide starting compounds of Formula II can be readily prepared by known methods. According to one method an ($\alpha$-fluoroalkyl)benzoyl chloride or fluoride is reacted with a phenylhydrazine as described by J. Hausknecht, Chem. Ber. 22, p. 324 (1889), and E. Bamberger and W. Pensel, Chem. Ber. 36, p. 359 (1903). Another method is described in U.S. Pat. No. 2,912,461, issued Nov. 10, 1959, that utilizes a benzoate ester and a phenylhydrazine. Still another method described by W. Autenrieth and G. Thomae, Chem. Ber. 57, p. 423 (1924) reacts a benzoic acid anhydride with a phenyl-hydrazine to produce the corresponding benzoic acid phenylhydrazide. Example 2, Part A, hereinafter illustrates a conventional method for making ($\alpha$-fluoroalkyl)benzoic acid 2-phenylhydrazide starting compounds.

The new anthelmintic ($\alpha$-fluoroalkyl)benzoyl chloride phenylhydrazones of this invention (compounds according to Formula I) can also be prepared by chlorinating an ($\alpha$-fluoroalkyl)benzaldehyde phenylhydrazone. Chlorination of an ($\alpha$-fluoroalkyl)benzaldehyde phenylhydrazone can be accomplished as described by J. E. Humphries, H. Humble and R. Evans, J. Chem. Soc. 127, p. 1304 (1925). But this chlorination is of limited usefulness when the starting ($\alpha$-fluoroalkyl)benzaldehyde phenylhydrazone has unsubstituted active sites that will yield to chlorination at positions on the phenylhydrazone portion that are desired to remain unsubstituted in a particular instance. Direct chlorination of ($\alpha$-fluoroalkyl)benzaldehyde phenylhydrazone is an effective way of producing ($\alpha$-fluoroalkyl)benzoyl chloride (2,4,6-trichlorophenyl)hydrazone.

Still another method described by L. A. Jones, C. K. Hancock, and R. B. Seligman, J. Org. Chem. 26, p. 228 (1961) can be used. The described method utilized $\alpha,\alpha,\alpha$2,4-dinitrophenylhydrazine to produce benzoyl chloride (2,4-dinitrophenyl)hydrazone. The new compounds of this invention can be prepared in the same manner.

EXAMPLE 2

Preparation of $\alpha,\alpha,\alpha$-Trifluoro-m-Toluoyl Chloride Phenylhydrazone Part A - m-(Trifluoromethyl)benzoic acid 2-phenylhydrazide To a cooled solution of 35.0 g. (0.323 mole) phenylhydrazine in 300 ml. pyridine at 4° to 9° C. was added 57.6 g. (0.300 mole) m-trifluoromethylbenzoyl fluoride. The reaction mixture was set aside at about 25° C. for 6 days. It was then poured into water and the aqueous mixture was stirred until crystallization was completed. The crystals were collected on a filter, washed with water, washed with 1 N hydrochloric acid, and washed with water again before recrystallization from aqueous ethanol. A further recrystallization from a mixture of benzene and technical hexane gave 72.3 g. (85.9 percent yield) of m-(trifluoromethyl)benzoic acid 2-phenylhydrazine having a melting point at 116° to 117.5° C. An analytical sample recrystallized from a mixture of 100 ml. benzene and 150 ml. technical hexane had substantially the same melting point.

Analysis:
Calc'd. for $C_{14}H_{11}F_3N_2O$: C, 60.00; H, 3.96; F, 20.34; N, 10.00.
Found: C, 60.40; H, 4.09; F, 19.96; N, 9.88.

Part B α,α,α-Trifluoro-m-toluoyl chloride phenylhydrazone

To a suspension of 21.86 g. (0.105 mole) phosphorus pentachloride in 200 ml. carbon tetrachloride was added 28.02 g. (0.100 mole) m-trifluoromethylbenzoic acid 2-phenylhydrazide (Prepared in Part A, above). The resulting suspension was stirred continuously at about 25° C. until evolution of gas decreased. The solution thus obtained was chilled in crushed ice and 33 g. (0.350 mole) phenol in 75 ml. carbon tetrachloride was added. After removing the carbon tetrachloride by evaporation at 30° C., the solution of product in triphenylphosphate was set aside for 1 week at 4° C. When the product did not separate out, the solution was poured over a 1.2 kg. column of silica gel. The product was eluted with a mixture of 1 part benzene and 1 part technical hexane. After removing the solvents by evaporation there was obtained 27.88 g. (93.3 percent yield) of α,α,α-trifluoro-m-toluoyl chloride phenylhydrazone as a yellow solid. Recrystallization from 75 ml. petroleum ether gave the desired pure compound having a melting point at 54° to 56° C.

Analysis:
Calc'd for $C_{14}H_{10}ClF_3N_2$: C, 56.29; H, 3.37; Cl, 11.87; F, 1908; N, 9.38.
Found: C, 56.75; H, 3.56; Cl, 11.78; F, 18.74; N, 9.61.

EXAMPLE 3

Following the procedure of Example 2, Part A, but substituting
3-bromo-5-(trifluoromethyl)benzoyl fluoride,
2-chloro-5-(trifluoromethyl)benzoyl fluoride,
2-iodo-3-(trifluoromethyl)benzoyl fluoride,
2-fluoro-5-(trifluoromethyl)benzoyl fluoride,
4-methyl-3-(trifluoromethyl)benzoyl fluoride,
3-ethyl-5-(trifluoromethyl)benzoyl fluoride,
3-isopropyl-5-(trifluoromethyl)benzoyl fluoride,
3-butyl-5-(trifluoromethyl)benzoyl fluoride,
3-n-hexyl-5-(trifluoromethyl)benzoyl fluoride,
p-(trifluoromethyl)benzoyl fluoride,
o-(trifluoromethyl)benzoyl fluoride,
3,5-di(trifluoromethyl)benzoyl fluoride,
3-nitro-4-(trifluoromethyl)benzoyl fluoride,
4-nitro-2-(trifluoromethyl)benzoyl fluoride,
m-(1,1-difluoroethyl)benzoyl fluoride,
3,5-dimethyl-4-(trifluoromethyl)benzoyl fluoride,
2-chloro-6-methyl-4-(trifluoromethyl)benzoyl fluoride, and
m-(1,1-difluoropropyl)benzoyl fluoride for m-trifluoromethylbenzoyl fluoride, there is prepared:
3-bromo-5-(trifluoromethyl)benzoic acid 2-phenylhydrazide,
2-chloro-5-(trifluoromethyl)benzoic acid 2-phenylhydrazide,
2-iodo-3-(trifluoromethyl)benzoic acid 2-phenylhydrazide,
2-fluoro-5-(trifluoromethyl)benzoic acid 2-phenylhydrazide,
4-methyl-3-(trifluoromethyl)benzoic acid 2-phenylhydrazide,
3-ethyl-5-(trifluoromethyl)benzoic acid 2-phenylhydrazide,
3-isopropyl-5-(trifluoromethyl)benzoic acid 2-phenylhydrazide,
3-butyl-5-(trifluoromethyl)benzoic acid 2-phenylhydrazide,
3-n-hexyl-5-(trifluoromethyl)benzoic acid 2-phenylhydrazide,
p-(trifluoromethyl)benzoic acid 2-phenylhydrazide,
o-(trifluoromethyl)benzoic acid 2-phenylhydrazide,
3,5-di(trifluoromethyl)benzoic acid 2-phenylhydrazide,
3-nitro-4-(trifluoromethyl)benzoic acid 2-phenylhydrazide,
4-nitro-2-(trifluoromethyl)benzoic acid 2-phenylhydrazide,
m-(1,1-difluoroethyl)benzoic acid 2-phenylhydrazide,
3,5-dimethyl-4-(trifluoromethyl)benzoic acid 2-phenylhydrazide,
2-chloro-6-methyl-4-(trifluoromethyl)benzoic acid 2-phenylhydrazide, and m-(1,1-difluoropropyl)benzoic acid 2-phenylhydrazide, respectively.

EXAMPLE 4

Further following the same procedure of Example 2, Part A, but substituting
(p-bromophenyl)hydrazine,
(p-chlorophenyl)hydrazine,
(p-nitrophenyl)hydrazine,
(2,4-diiodophenyl)hydrazine,
(p-ethylphenyl)hydrazine,
(p-n-hexylphenyl)hydrazine,
(p-isopropylphenyl)hydrazine,
(2-chloro-4-nitrophenyl)hydrazine,
(4-methyl-2-nitrophenyl)hydrazine, and
(p-trifluoromethylphenyl)hydrazine for phenylhydrazine there is prepared:
m-(trifluoromethyl)benzoic acid 2-(p-bromophenyl)hydrazide,
m-(trifluoromethyl)benzoic acid 2-(p-chlorophenyl)hydrazide,
m-(trifluoromethyl)benzoic acid 2-(p-nitrophenyl)hydrazide,
m-(trifluoromethyl)benzoic acid 2-(2,4-diiodophenyl)hydrazide,
m-(trifluoromethyl)benzoic acid 2-(p-ethylphenyl)hydrazide,
m-(trifluoromethyl)benzoic acid 2-(p-n-hexylphenyl)hydrazide, m-(trifluoromethyl)benzoic acid 2-(p-isopropylphenyl)hydrazide,
m-(trifluoromethyl)benzoic acid 2-(2-chloro-4-nitrophenyl)hydrazide,
m-(trifluoromethyl)benzoic acid 2-(4-methyl-2-nitrophenyl)hydrazide, and
m-(trifluoromethyl)benzoic acid 2-(p-trifluoromethylphenyl)hydrazide, respectively.

EXAMPLE 5

Following the procedure of Example 2, Part B, but substituting
3-bromo-5-(trifluoromethyl)benzoic acid 2-phenylhydrazide,
2-chloro-5-(trifluoromethyl)benzoic acid 2-phenylhydrazide,
2-iodo-3-(trifluoromethyl)benzoic acid 2-phenylhydrazide,
2-fluoro-5-(trifluoromethyl)benzoic acid 2-phenylhydrazide,
4-methyl-3-(trifluoromethyl)benzoic acid 2-phenylhydrazide,
3-ethyl-5-(trifluoromethyl)benzoic acid 2-phenylhydrazide,
3-isopropyl-5-(trifluoromethyl)benzoic acid 2-phenylhydrazide,
3-butyl-5-(trifluoromethyl)benzoic acid 2-phenylhydrazide,
3-n-hexyl-5-(trifluoromethyl)benzoic acid 2-phenylhydrazide,
p-(trifluoromethyl)benzoic acid 2-phenylhydrazide,
o-(trifluoromethyl)benzoic acid 2-phenylhydrazide,
3,5-di(trifluoromethyl)benzoic acid 2-phenylhydrazide,
3-nitro-4-(trifluoromethyl)benzoic acid 2-phenylhydrazide,
4-nitro-2-(trifluoromethyl)benzoic acid 2-phenylhydrazide,
m-(1,1-difluoroethyl)benzoic acid 2-phenylhydrazide,
3,5-dimethyl-4-(trifluoromethyl)benzoic acid 2-phenylhydrazide,
2-chloro-6-methyl-4-(trifluoromethyl)benzoic acid 2-phenylhydrazide,
m-(1,1-difluoropropyl)benzoic acid 2-phenylhydrazide,
m-(trifluoromethyl)benzoic acid 2-(bromophenyl)hydrazide,
m-(trifluoromethyl)benzoic acid 2-(p-chlorophenyl)hydrazide,
m-(trifluoromethyl)benzoic acid 2-(p-nitrophenyl)hydrazide,
m-(trifluoromethyl)benzoic acid 2-(2,4-diiodophenyl)hydrazide,
m-(trifluoromethyl)benzoic acid 2-(p-ethylphenyl)hydrazide,
m-(trifluoromethyl)benzoic acid 2-(p-n-hexylphenyl)hydrazide,
m-(trifluoromethyl)benzoic acid 2-(p-isopropylphenyl)hydrazide,
m-(trifluoromethyl)benzoic acid 2-(2-chloro-4-nitrophenyl)hydrazide,
m-(trifluoromethyl)benzoic acid 2-(4-methyl-2-nitrophenyl)hydrazide, and
m-(trifluoromethyl)benzoic acid 2-(p-trifluoromethyl)hydrazide for m-(trifluoromethyl)benzoic acid 2-phenylhydrazide, there were prepared
3-bromo-5-(trifluoromethyl)benzoyl chloride phenylhydrazone,
2-chloro-5-(trifluoromethyl)benzoyl chloride phenylhydrazone,
2-iodo-3-(trifluoromethyl)benzoyl chloride phenylhydrazone,
2-fluoro-5-(trifluoromethyl)benzoyl chloride phenylhydrazone,
4-methyl-3-(trifluoromethyl)benzoyl chloride phenylhydrazone,
3-ethyl-5-(trifluoromethyl)benzoyl chloride phenylhydrazone,
3-isopropyl-5-(trifluoromethyl)benzoyl chloride phenylhydrazone,
3-butyl-5-(trifluoromethyl)benzoyl chloride phenylhydrazone,
3-n-hexyl-5-(trifluoromethyl)benzoyl chloride phenylhydrazone,
p-(trifluoromethyl)benzoyl chloride phenylhydrazone,
o-(trifluoromethyl)benzoyl chloride phenylhydrazone,
3,5-di-(trifluoromethyl)benzoyl chloride phenylhydrazone,
3-nitro-4-(trifluoromethyl)benzoyl chloride phenylhydrazone,
4-nitro-2-(trifluoromethyl)benzoyl chloride phenylhydrazone,
m-(1,1-difluoroethyl)benzoyl chloride phenylhydrazone,
3,5-dimethyl-4-(trifluoromethyl)benzoyl chloride phenylhydrazone,
2-chloro-6-methyl-4-(trifluoromethyl)benzoyl chloride phenylhydrazone,
m-(1,1-difluoropropyl)benzoyl chloride phenylhydrazone,
m-(trifluoromethyl)benzoyl chloride (p-bromophenyl)hydrazone,
m-(trifluoromethyl)benzoyl chloride (p-chlorophenyl)hydrazone,
m-(trifluoromethyl)benzoyl chloride (p-nitrophenyl)hydrazone,
m-(trifluoromethyl)benzoyl chloride (2,4-diiodophenyl)hydrazone,
m-(trifluoromethyl)benzoyl chloride (p-ethylphenyl)hydrazone,
m-(trifluoromethyl)benzoyl chloride (p-n-hexylphenyl)hydrazone,
m-(trifluoromethyl)benzoyl chloride (p-isopropylphenyl)hydrazone,
m-(trifluoromethyl)benzoyl chloride (2-chloro-4-nitrophenyl)hydrazone,
m-(trifluoromethyl)benzoyl chloride (4-methyl-2-nitrophenyl)hydrazone, and
m-(trifluoromethyl)benzoyl chloride (p-trifluoromethylphenyl)hydrazone, respectively.

EXAMPLE 6

Preparation of α,α,α-Trifluoro-m-toluoyl chloride (2,4-dibromophenyl)hydrazone

To an ice-cold solution of 5.28 g. (0.0200 mole) α,α,α200 ml. carbon tetrachloride is added 10.8 g. (0.0675 mole) bromine dissolved in 25 ml. carbon tetrachloride. The solution is heated at the reflux temperature for 4 hrs., and then the carbon tetrachloride is removed by evaporation under reduced pressure. The residue thus obtained is recrystallized from technical hexane to give the desired α,α,α-trifluoro-m-toluoyl chloride (2,4-dibromophenyl)hydrazone.

I claim:

1. The method of killing and controlling parasitic worms in animals which comprises administering to an animal a therapeutic or prophylactic dosage of an (α-fluoroalkyl)benzoyl chloride phenylhydrazone having the structural formula:

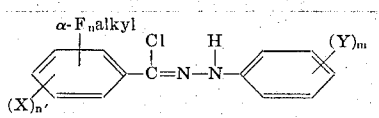

wherein a α-$F_n$alkyl is an α-fluoroalkyl group of from one to three carbon atoms, inclusive; $n$ is the integer 2 or 3; X is halogen, alkyl of from one to six carbon atoms, inclusive, α-$F_n$alkyl, and nitro; Y is halogen, alkyl of from one to six carbon atoms, inclusive, α-$F_n$alkyl, and nitro; $n'$ is an integer from 0 to 3, inclusive; and $m$ is an integer from 0 to 3, inclusive; the sum of $n' + m$ being not more than 5, the sum of carbon atoms in alkyl substituents being not more than 15, there being no more than one nitro group in the molecule, and no more than two α-$F_n$alkyl groups on any benzene ring or three total in the molecule.

2. The method according to claim 1 wherein the compound α,α,α-trifluoro-m-toluoyl chloride phenylhydrazone itself is administered.

3. The method according to claim 1 wherein α-$F_n$alkyl is trifluoromethyl.

4. The method according to claim 3 wherein the trifluoromethyl group is in the meta position.

5. The method according to claim 4 wherein $n'$ is zero.

6. The method according to claim 1 wherein ovines are treated.

7. The method according to claim 1 wherein the active agent is administered in the form of a capsule.

8. The method according to claim 7 wherein ovines are treated with α,α,α-trifluoro-m-toluoyl chloride phenylhydrazone.

9. A unit dosage formulation for administration to animals for the purpose of killing and controlling parasitic worms in said animals comprising a physiologically acceptable carrier and adjuvants, and at least an effective amount of an (α-fluoroalkyl)benzoyl chloride phenylhydrazone having the structural formula:

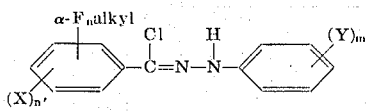

wherein α-$F_n$alkyl is an α-fluoroalkyl group of from one to three carbon atoms, inclusive; n is the integer 2 or 3; X is halogen, alkyl of from one to six carbon atoms, inclusive, α-$F_n$alkyl, and nitro; Y is halogen, alkyl of from one to six carbon atoms, inclusive, α-$F_n$alkyl, and nitro; $n'$ is an integer from 0 to 3, inclusive; and $m$ is an integer from 0 to 3, inclusive; the sum of $n' + m$ being not more than 5, the sum of carbon atoms in alkyl substituents being not more than 15, there being no more than one nitro group in the molecule and no more than two α-$F_n$alkyl groups in any one benzene ring or three total in the molecule.

10. Formulation according to claim 9 comprising the specific compound α,α,α-trifluoro-m-toluoyl chloride phenylhydrazone.

11. Formulation according to claim 9 wherein a α-$F_n$alkyl is trifluoromethyl.

12. Formulation according to claim 11 wherein the trifluoromethyl group is in the meta position.

13. Formulation according to claim 12 wherein $n'$ is zero.

14. Formulation according to claim 9 wherein the carrier and active compound are combined in unit dosage form having from less than 1 mg. to 500 g. of active compound.

15. Formulation according to claim 14 wherein a surface active agent component is included.

16. Formulation according to claim 15 comprising the specific compound α,α,α-trifluoro-m-toluoyl chloride phenylhydrazone.

17. Formulation according to claim 15 wherein α-$F_n$alkyl is trifluoromethyl.

18. Formulation according to claim 17 wherein the trifluoromethyl group is in the meta position.

19. Formulation according to claim 18 wherein $n'$ is zero.

20. A therapeutic formulation comprising in encapsulated form a dispersible carrier and from about 50 mg. to about 25 gms. of an (α-fluoroalkyl)benzoyl chloride phenylhydrazone having the structural formula:

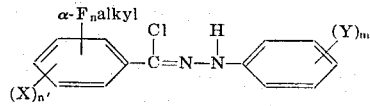

wherein α-$F_n$alkyl is an α-fluoroalkyl group of from one to three carbon atoms, inclusive; n is the ingeter 2 or 3; X is halogen, alkyl of from one to six carbon atoms, inclusive, α-$F_n$alkyl, and nitro; Y is halogen, alkyl of from one to six carbon atoms, inclusive, α-$F_n$alkyl, and nitro; $n'$ is an integer from 0 to 3, inclusive; and $m$ is an integer from 0 to 3, inclusive; the sum of $n' + m$ being not more than 5, the sum of carbon atoms in alkyl substituents being not more than 15, there being no more than one nitro group in the molecule, and no more than two α-$F_n$alkyl groups on any one benzene ring or three total in the molecule.

21. Formulation according to claim 20 wherein the dispersible carrier is a liquid.

22. Formulation according to claim 20 wherein the dispersible carrier is a finely divided solid.

23. Formulation according to claim 22 comprising the specific compound α,α,α-trifluoro-m-toluoyl chloride phenylhydrazone.

24. Formulation according to claim 20 wherein α-$F_n$alkyl is trifluoromethyl.

* * * * *